July 31, 1951     W. WOCKENFUSS     2,562,252
CHANGE OF DESIGNATION CONTROL FOR TABULATORS
Original Filed March 4, 1948     5 Sheets-Sheet 1

Fig.1

INVENTOR.
William Wockenfuss,
BY
Edward L. Mueller
ATTORNEY.

July 31, 1951 W. WOCKENFUSS 2,562,252
CHANGE OF DESIGNATION CONTROL FOR TABULATORS
Original Filed March 4, 1948 5 Sheets-Sheet 4

Fig. 4

INVENTOR.
William Wockenfuss,
BY
Edward L. Mueller
ATTORNEY.

Patented July 31, 1951

2,562,252

UNITED STATES PATENT OFFICE 2,562,252

CHANGE OF DESIGNATION CONTROL FOR TABULATORS

William Wockenfuss, Union, N. J., assignor to Control Instrument Company, Inc., Brooklyn, N. Y., a corporation of New York Original application March 4, 1948, Serial No. 13,017. Divided and this application July 15, 1949, Serial No. 104,988

14 Claims. (Cl. 235—61.11)

This invention relates to improvements in tabulators and has particular reference to a change of designation control therefor, this application being a division of my co-pending application Serial No. 13,017, filed March 4, 1948.

An object of the invention is to utilize, in an improved manner, sensing and analyzing stations each having mechanisms thereat in which cards are compared and from which a controlled element is differentially actuated, by the likeness or dissimilarity in designation between cards at the two stations, to control the continuation of the card feed or the stopping thereof and initiation of a total-taking cycle.

The above and other objects will appear more clearly from the following detailed description when taken in connection with the accompanying drawings; but it is to be expressly understood that the illustration in said drawings is employed merely to facilitate the description of the invention as a whole and not to define the limits thereof, reference being had to the appended claims for this purpose.

Generally, the tabulator comprises a supporting base 30 from which extend upwardly the front and back side plates 31 and 32 of the analyzing section of the machine. Between said plates is mounted a sub-base 33 which supports a transverse wall 34 that combines with a similar wall 35 supported upon the base 30 to form a chamber 36 for receiving and stacking cards after their analysis. Said wall 35 separates the analyzing section of the machine from the tabulating section which is fully described in said parent application. Pivotally connected, at 38, to the upper portions of the side plates 31 and 32, are the two rails 39 of an auxiliary frame which further comprises the side plates 40 and 41 and a cover plate 42, said pivotal connection permitting said auxiliary frame and the entire mechanism supported thereby to be swung upwardly to a substantially vertical position, after effecting certain disconnections to be later described, in order that ready access may be had to the interior of the analyzing section in the event of a card jam, or for other purposes. The auxiliary frame is held in its horizontal operative position by removable dowel screws 43 extending through the rails 39 and into the side plates 31, 32.

The main drive shaft 44 (Fig. 3) extends transversely of the machine directly above the base 30 and through the side plates 31, 32, and is coupled, through a friction overload clutch conventionally shown at 45, to a pulley 46 at one end of the shaft which is connected to a driving motor (not shown) mounted conveniently below said base. A worm 48 on the shaft constantly drives a gear 49 surrounding the primary cam shaft 50 of the tabulating section of the machine and is adapted to be coupled to said shaft by a well known type of clutch mechanism, generally indicated at 51, which is controlled by the intermittently operable print clutch solenoid 51a to drive said shaft through one revolution each time the solenoid is energized and to stop said shaft at the end of its revolution if the solenoid is not re-energized. Said shaft 44 is also connected, by gearing 52, to a continuously operating shaft 53 which extends upwardly along the rear side plate 32 and adjacent wall 35, and constitutes the driving power for the card feeding and analyzing section of the machine. The upper end of shaft 53 is geared, at 54 (Fig. 2) to the horizontal shaft 55 supported in bearings on the outside of the plate 32 and having a worm 56 thereon which constantly drives a large gear 57 (Fig. 3) which surrounds and is adapted to be coupled to one end of the transverse shaft 58 having bearings in the plates 31, 32 and operable to control the various functions of said feeding and analyzing section. The coupling of said gear and shaft 58 is accomplished through a clutch mechanism 59 (Fig. 2), similar to the clutch 51, controlled by the feed solenoid 59a which is intermittently energized and de-energized during each cycle of the machine as long as the feed and analysis of the cards is to continue, but which remains de-energized during a total-taking cycle so that said clutch will be effective to stop rotation of said shaft 58 to thereby discontinue operation of the feeding and analyzing mechanisms.

Figure 2:
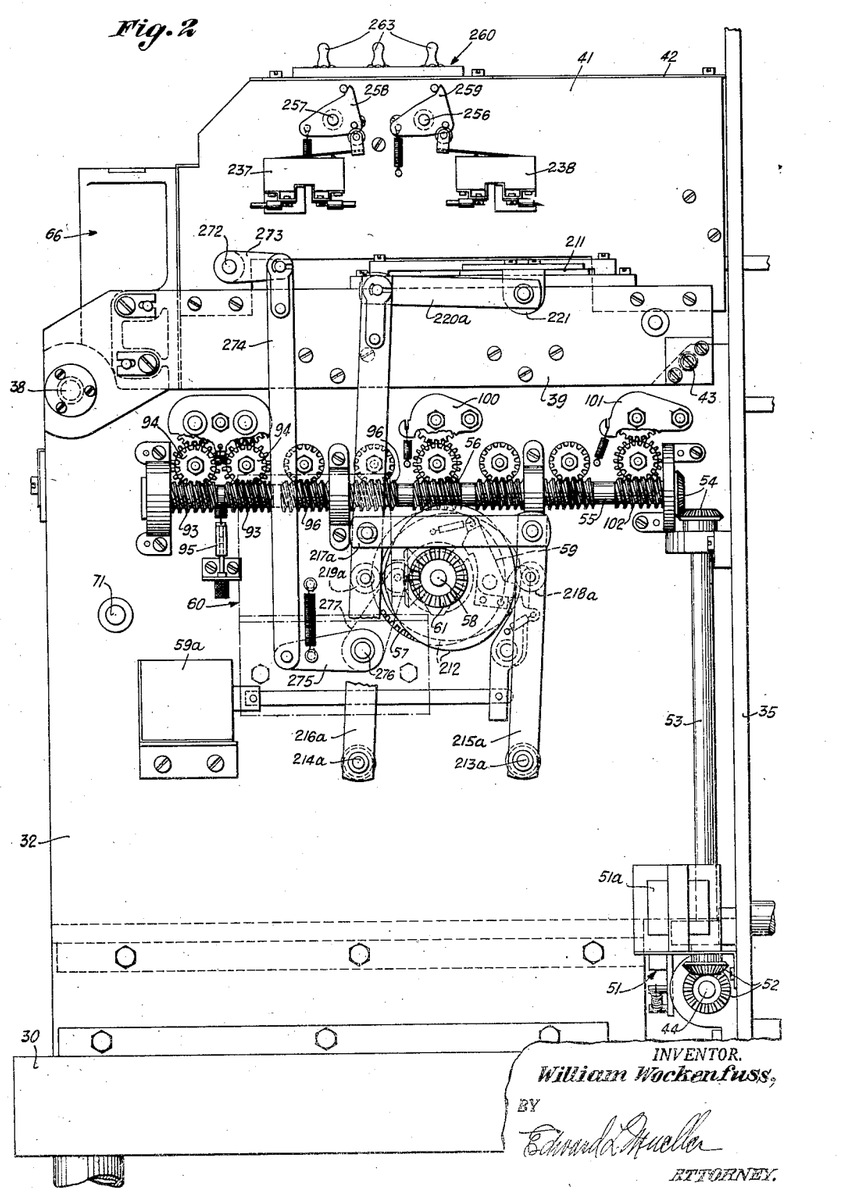
Fig. 2 is a rear elevation thereof.
Figure 3:
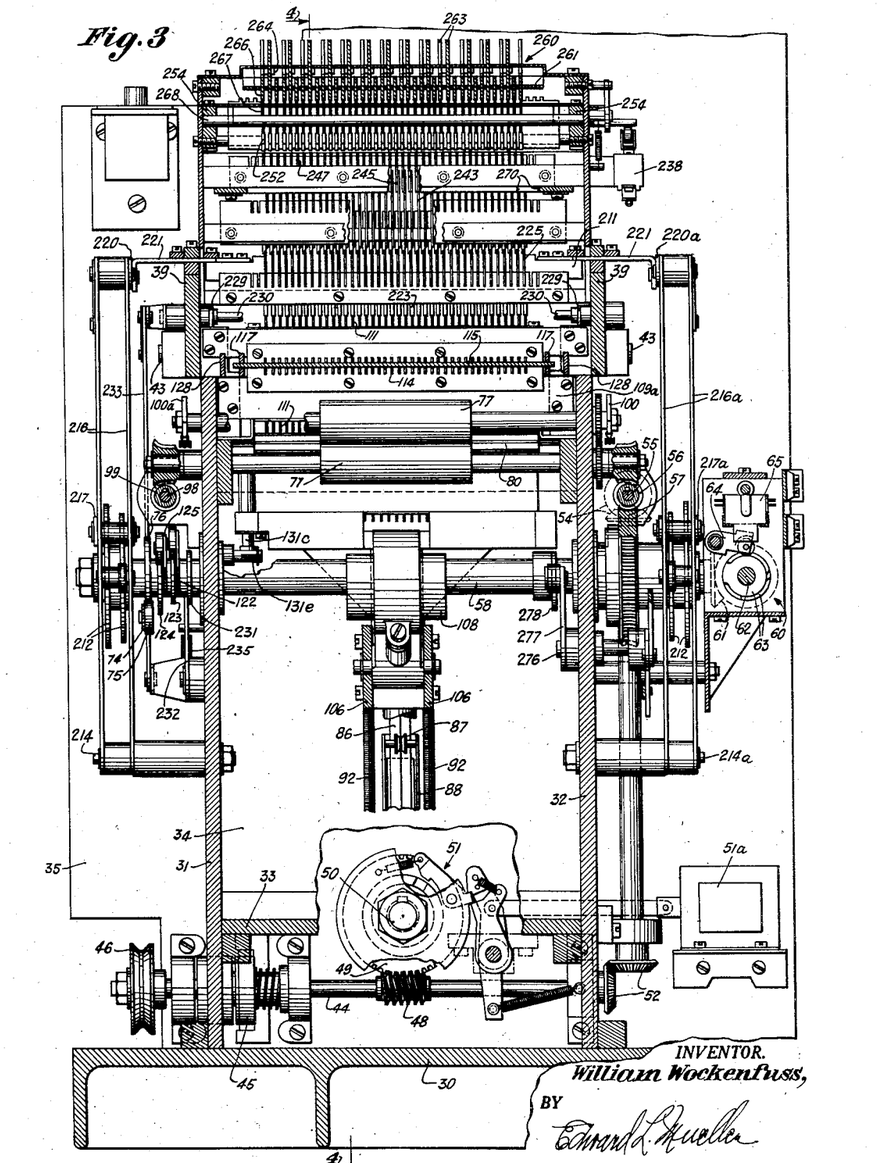
Fig. 3 is a transverse section through the analyzer section taken on the line 3—3 of Fig. 1.

The switching unit 60, attached to the wall 32 and shown in dotted and full lines in Figs. 2 and 3 and which controls electrical circuits involved in various functions of the machine fully described in said parent application, is operated directly from the shaft 58 by a gear 61 which drives a cam shaft 62 in said unit 60. A plurality of cams generally indicated at 63 on said shaft 62 actuate individual switch arms 64 at different predetermined intervals to control the micro switches conventionally shown at 65 and included in said electrical circuits.

The opposed walls of the card magazine 66, which latter is attached to the rails 39 and is thus movable with the auxiliary frame, are provided with vertical guide strips 67 (Fig. 4) that extend the entire height of said walls with their upper ends fixed to the top of the magazine and their lower ends free to be flexed by adjusting screws 68 whereby the cards may be properly centered in the magazine and allowance made for minute changes in the lengths of the cards caused by humidity variations.

*Card feed mechanism*

Cards are fed from the magazine 66 (Fig. 4) by a reciprocating picker 69 operated from the crank 70 on the rock shaft 71 which is connected through the crank 72 (Fig. 1) to a link 73 operated by the bell crank 74 having a follower 75 engaging with a cam 76 (Fig. 3) on the front end of the shaft 58. As successive cards leave the magazine (Fig. 4), they are carried along by pairs of feed rollers 77, first, into the card chamber 78 of a sensing station forming part of the analyzing mechanism and generally indicated at 79, then into the chamber 80 of the analyzing station 81 constituting the remainder of said mechanism, and thence to the discharge or stacker chamber 36, the cards at each station being held stationary by the stop members 82 during the sensing and analyzing of said cards.

In the stacker chamber 36 there is disposed a vertically movable platform 83 carrying a plate 84 upon which cards are deposited from the adjacent rollers 77, and said platform is guided in its movements by a slot 85 formed in the wall 34. The platform 83 has depending therefrom an elongated rod 86 which is guided between pairs of rollers 87 carried in a bracket 88 secured to the wall 34, and which extends downwardly through the base members 33 and 30 and carries at its lower extremity a cross piece 89 to operate a switch contact 91 to release a normally closed micro switch 91a to thereby stop the feed of cards from the magazine 66 when the chamber 36 is full. The platform 83 is normally urged upwardly by a pair of coil springs 92 fixed at their upper ends to the wall 34 and connected at their lower ends to the cross piece 89.

The lower rollers 77 of the two pair adjacent the magazine 66 are positively driven by worms 93 on the shaft 55 meshing with gears 94 on the shafts of said rollers, and the upper rollers of said pairs are geared to the lower rollers, and the upper rollers of said pairs are geared to the lower rollers and have adjustable tensioning devices 95 and 95a connected thereto. The next pair of rollers 77 are designed to have contact only with the edges of cards passing through the sensing station 79 and are geared to worms 96 on the shaft 55 and to worms 97 on the counter shaft 98 mounted on the side plate 31, and the pair of lower rollers associated with the analyzing station 81 are similarly geared to the two shafts 55, 98. The shaft of the lower roller of the pair between the two stations is driven from the worm 56 and, on the other side of the machine, drives the worm 99 on the shaft 98, and the upper roller of said pair is geared to its lower roller and maintained in driving connection therewith by tensioning devices 100, 100a on opposite sides of the machine. Similar devices 101, 101a, maintain the upper roller of the last pair adjacent the card stacker chamber 36 operatively connected to the lower roller of said pair which is driven by worm 102 on the shaft 55 and thus all sets of rollers are driven continuously during the operation of the machine.

*Sensing and analyzing mechanism*

The vertically reciprocating pin boxes 103, 103a (Fig. 4) of the sensing and analyzing stations 79, 81 are of identical construction with the exception, for control purposes, that the latter pin box mounts one more sensing pin 104 in each row individual to a card column than the box 103. Said pin boxes are supported by castings 105 connected by cross plates 106 and have their lower extremities guided in standards 107. An eccentric 108 on the shaft 58 is coupled to the plates 106 so as to reciprocate the pin boxes in unison during rotation of said shaft. Stations 79, 81, further comprise upper pin boxes 109, 109a supported in position above the boxes 103, 103a by the rails 39 so as to be movable with the latter and carry with them the card stops 82 when the auxiliary frame of which the rails 39 form a part is swung to open position wherein it will now be apparent that the rollers 77 and the card chambers 78, 80 will be fully exposed so that easy access may be had thereto in case of repair or a card jam. Rows of pins 110, 111, equal to the number of columns in the cards, are mounted in the upper pin boxes 109, 109a, and are vertically aligned with the respective rows of pins 104 in the lower boxes. In addition, the pin box 109a has, in each row of pins 111, a control pin 112 adapted to be operated by the additional pin 104 in the corresponding row of the associated pin box 103a, and said pin 112 is provided with an extension 113 utilized in connection with the control or X position at the head of each card column. Lock plates 114 in the two upper pin boxes 109, 109a are provided for each row of pins 110, 111, 112 to momentarily hold those pins elevated, during the sensing and analyzing operations, which have been raised by the sensing of holes in a card by pins 104 in the lower pin boxes. The plates 114 are under the combined control of cross bails 115, each common to the plates in one of the upper pin boxes, and of individual spring urged bell cranks 116 each of which tends to move its plate 114 to the right, as viewed in Fig. 4. The bails 115 are carried by two bars 117 (Fig. 3) on opposite sides of the boxes 109, 109a and these bars are actuated, immediately following the elevation of the pins 110, 111, by cranks 118 at opposite ends of a rock shaft 119 supported in the rails 39. Such actuation moves the bails to the right and thus permits the bell cranks 116 to shift the lock plates into locking position relative to the elevated pins 110, 111. Said lock plates remain in operative position until the bails 115 are returned to restore said plates and thereby release the elevated pins following the performance of their functions. The shaft 119 carries a crank 120 (Fig. 1) to which is detachably connected a link 121 joined to a lever 122 (Fig. 3)

operated by a cam 123 on the shaft 58 to control the reciprocating movements of the bails 115.

Figure 1:
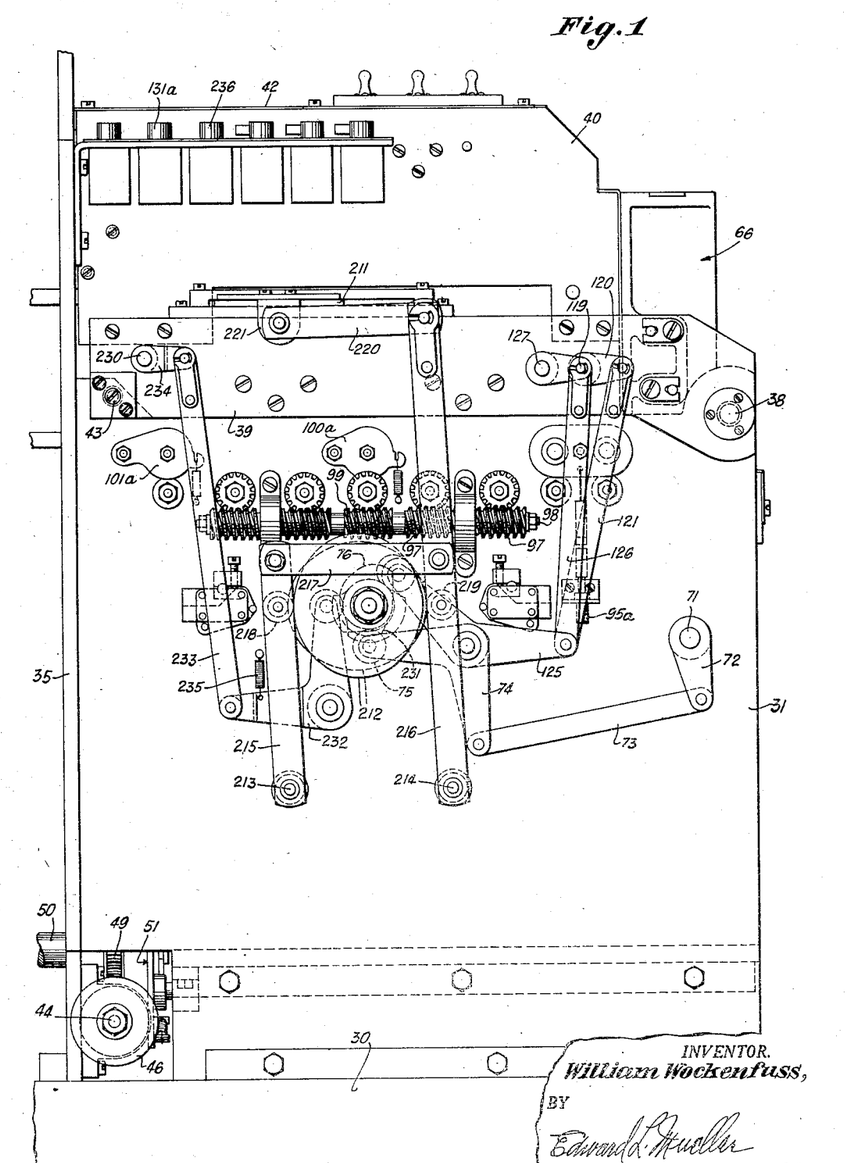
Fig. 1 is a front elevation of the analyzing section of a tabulator constructed in accordance with the invention.

The card stops 82 are controlled from a cam 124 on the shaft 58 engaging a lever 125 which is directly in front of the lever 122, as seen in Fig. 1. A link 126 detachably connects the lever 125 to a rock shaft 127 to which are joined, by cranks, adjacent ends of two bars 128 (Figs. 3 and 4) arranged alongside of the bars 117, and the other ends and intermediate portions of said bars 128 are diagonally slotted at 129 to receive pins 130 carried by the slidable plate 131 on each pin box 109, 109a and which carries a stop 82 associated with the adjacent pin box. Through this linkage, cam 124 operates the two bars 128 to simultaneously raise the card stops 82 upon retraction of the sensing pins 104 so that the cards temporarily held in the chambers 78 and 80 will be discharged therefrom by the continuously driven rollers 77, after which the stops are again lowered by the cam 124 to stop the succeeding cards entering said chambers during the next cycle of operation.

Figure 7:
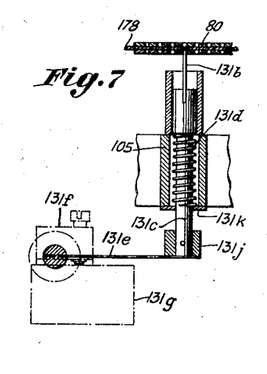
Fig. 7 is a sectional view of a card sensing device located at each of the sensing and analyzing stations and shown in its operative position when occupied by a card.

After the motor has been energized, the machine operation is initiated by depressing the start key 131a (Fig. 1) to thereby energize the feed clutch solenoid 59a which then permits the clutch 59 to become effective to drive the shaft 58. Said solenoid is de-energized during each revolution of said shaft but is re-energized before declutching of the shaft can take place, as long as the feed of the cards is to continue. The key 131a is held depressed to maintain the starting circuit closed for two machine cycles to thus allow two cards to be fed from the magazine and to the stations 79, 81, which would not otherwise occur because of card sensing devices at said stations that operate, in the absence of a card at either station, to stop the machine. Each of said devices (Figs. 3 and 7) includes a card sensing pin 131b carried by the movable pin box at its station and adapted to sense the presence or absence of a card thereat. Said pin 131b is supported by a plunger 131c movable in the casing 105 and which is normally urged upwardly by the coil spring 131d, and the lower end of said plunger is positioned directly over and movable relative to the free end of a contact arm 131e rockingly supported in the block 131f carried by a multi-contact microswitch 131g. When pin 131b does not engage a card, the plunger 131c moves upwardly and out of engagement with the arm 131e and the various contacts of the associated microswitch 131g assume their normal position. As each plunger 131c moves downwardly, its collar 131j will contact and flex the arm 131e, thus reversing the normal condition of the various switch contacts and if, upon the next upward movement of said plunger, the pin 131b engages a card 178 as shown in Fig. 7, said upward movement of the plunger will be arrested with its collar still contacting the arm 131e to retain the latter in its operated position. Therefore, the contacts controlled by said arm will be held in their reversed positions as long as a pin is in sensing position, and as the pin box casting 105 again recedes, the plate 131h thereon will contact the collar 131j to lower the plunger 131c and its pin 131b sufficiently to allow the card just sensed to be fed from the card chamber.

The micro switches 131g at the two stations are in series with an energizing circuit (not shown) that controls the print clutch solenoid 51a; hence, cards must be present at both stations 79, 81 and both said switches must be closed before the start key is released in order that said solenoid 51a may be energized to couple the shafts 44 and 50 and thereby effect operation of the printing and accumulating section of the machine. Also, as will later appear in detail, with the first card of a run at station 79 but none at station 81, a non-comparing condition will exist which, when sensed during the first cycle, will cause the group control mechanism to operate and thus prepare the machine for a total-taking operation on the next cycle by preventing the feed solenoid from energizing to thereby stop further feeding operation and by causing the print solenoid 51a to be energized to drive the shaft 50. During said first cycle and with the print clutch solenoid 51a de-energized, the print section of the machine remains inoperative since the shaft 50 will not yet be coupled to the shaft 44, but when a change of designation takes place and the shaft 50 is driven through the next cycle, it will raise the type bars of the machine to their extreme or blank positions so that no printing will result. Subsequently, the machine enters its third cycle with cards at both stations 79, 81 and normal operation then proceeds in a manner which will be understood from the following description.

*Scanning device for upper pin boxes*

This device is used for the purpose of scanning the pins 110 in the upper pin box 109 of the sensing station 79 at which cards are compared with those at station 81 to sense a change of designation and to initiate the operation of the group control mechanism in case punched code designations in the cards at the two stations do not compare, as will be later described in detail.

The frame 211 of the device, which is mounted over the pin boxes 109, 109a, is reciprocated in timed relation to the analysis and sensing of the cards at the two stations and its movement is under the control of two pairs of complementary cams 212 (Figs. 1, 2 and 3) at opposite ends of the shaft 58. On opposite sides of the machine and on opposed sides of each pair of cams there are fulcrumed at 213, 213a and 214, 214a, to each of the side plates 31 and 32, the pairs of short and long levers 215, 216 and 215a, 216a connected by the cross links 217 and 217a. The pairs of levers 215, 215a on opposite sides of the machine carry rollers 218, 218a, each engaging with one of the adjacent cams 212, while rollers 219, 219a on the pairs of levers 216, 216a engage the adjacent complementary cams so that as the two sets of cams are rotated by the shaft 58 the described leverage will oscillate about the fulcrums 213, 213a and 214, 214a. The upper ends of the two pairs of levers 216, 216a on opposite sides of the machine are detachably and pivotally connected to links 220, 220a which join said levers to the extensions 221 on opposite sides of the scanning frame 211 so as to reciprocate the same.

Figure 4:
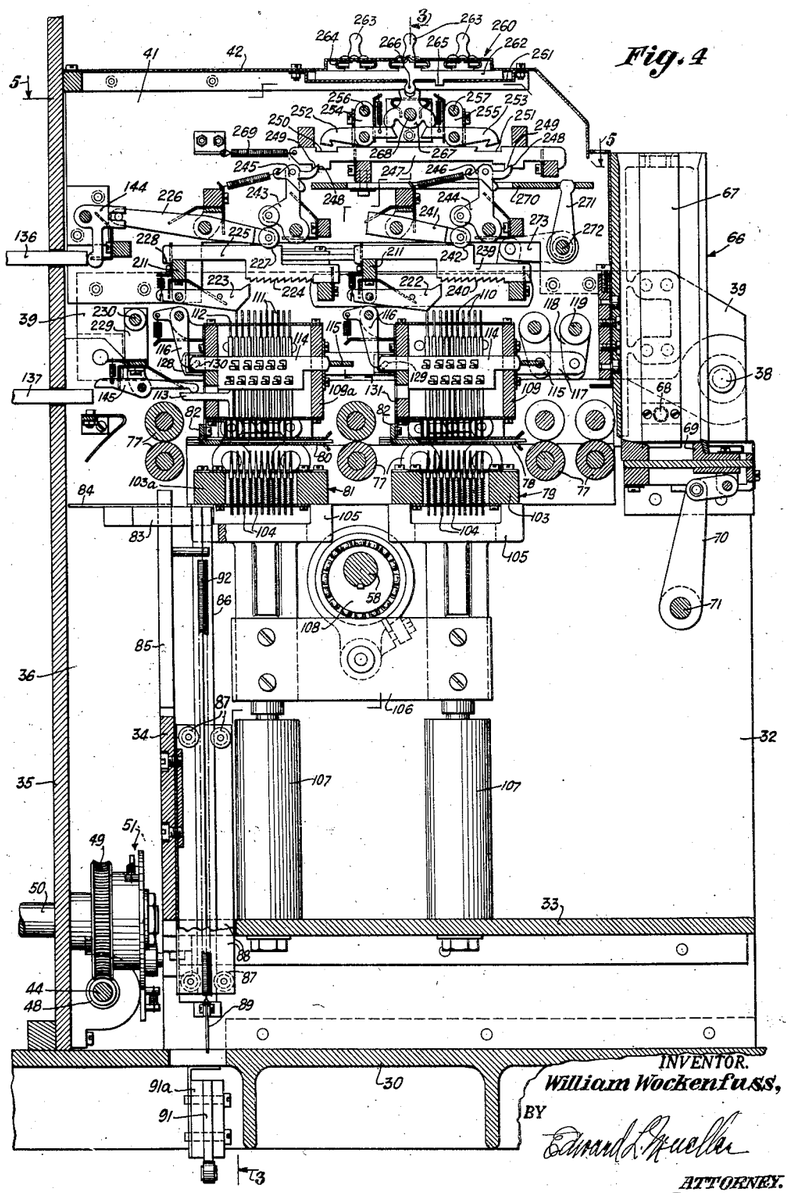
Fig. 4 is a vertical longitudinal section on the line 4—4 of Fig. 3.
Figure 5:
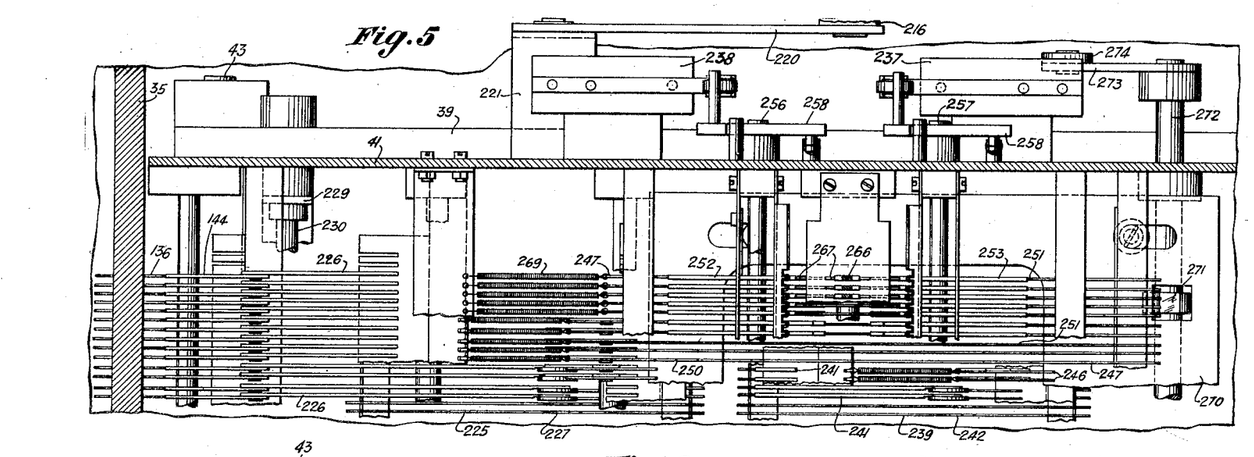
Fig. 5 is an enlarged fragmentary horizontal section on the line 5—5 of Fig. 4.

The elevation and locking of pins 110 and 111 in the units 79, 81, as a result of the operative strokes of the pin boxes 103, 103a, is immediately followed by the right hand movement, as viewed in Fig. 4, of the scanning device which now functions to sense any locked pins 110, 111 and to transmit data represented by the latter pins through an analyzer controlled mechanism. This sensing is accomplished, with respect to the pins 110, by operating pawls 222, one for each row of pins, pivotally mounted in the scanning frame 211 for operation in connection with the automatic group control mechanism. Similar pawls 223 also forming part of said analyzer controlled mechanism and supported in the frame 211 move over the pins 111 in the pin box 109a and wherever a pawl encounters an elevated pin, said pawl will be raised to engage the corresponding tooth of its associated slide 225 which, until such engagement, remains stationary with respect to the frame 211. However, when said slide is so engaged, it will move with the scanning frame to the end of its stroke and, in so doing, its initial movement will rock the associated lever 226 due to the recess 227 in the upper edge of the slide in which one end of said lever normally rests. This movement of the lever will rock the bell crank 144 individual thereto so as to operate the associated actuating bar 136 which forms part of the analyzer controlled mechanism for the upper transfer unit described in said parent application. After all the pins 111 have been scanned and the data represented thereby has been transmitted to said transfer unit by the various operated bars 136, the scanning frame returns to its starting position and, during this secondary stroke, restores the operated slides 225, and also the slides 239 later to be described, by engagement of portions of the frame with the lips 228 of said slides, whereupon all operated levers 226 and bell cranks 144 will also be restored by a subsequent action which takes place in the control of the bars 136.

When an X hole is sensed at the station 81 by the additional pin 104 in the pin box 103a, its corresponding control pin 112 is elevated, but this pin being shorter than the pins 111, will not be contacted by the pawl 223 thereabove. The raising of said pin 112 causes its extension 113 to engage the adjacent end of its associated lever 145 pivotally mounted in the swinging bail 229 so that the opposite end of said lever will align itself with the associated actuating bar 137 of the analyzer controlled mechanism for the lower transfer unit also described in said parent application, whereupon the bail 229 is swung to the left as viewed in Fig. 4, to cause any of the operated levers 145 to impart linear movement to the respective bars 137 with which they are aligned while any unactuated levers 145 will pass over their bars. This action takes place before the scanning device starts its primary movement so as to enable any operated bar 137 to effect the suppression of an associated type bar in the print section of the machine (not shown) before it can start its upward travel in timed relation to the movement of the scanning device, or to perform other functions which are controlled by the appearance of an X hole.

The bail 229 common to all the levers 145 is rockingly supported on the shaft 230 extending between the rails 39 and said shaft is controlled by a cam 231 (Fig. 3) mounted on the shaft 58. Said cam is engaged by one end of the bell crank 232 (Fig. 1) pivoted on the side plate 31, to the other end of which is connected the lower extremity of the link 233; and the upper end of said link is detachably connected to a crank 234 carried by said rock shaft 230. After its operation by the cam 231, the bail 229 and the associated parts are restored by the spring 235 connected to the bell crank 232.

*Designation Change Sensing Mechanism*

Figure 6:
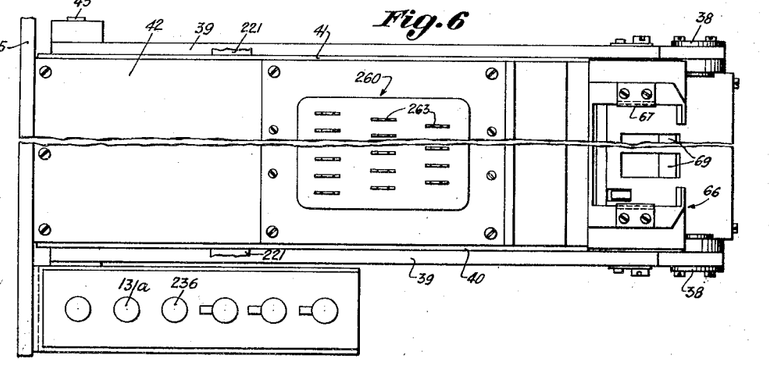
Fig. 6 is a fragmentary top plan view of the analyzer section.

This mechanism, as generally understood in the art, has for its purpose the initiation of a total-taking cycle upon the sensing of a change of group designation in the cards being analyzed. In the present machine, this is accomplished by the mechanical comparison of cards at the sensing and analyzing stations 79 and 81, and when said cards do not compare, indicating a change of designation, the operation of the analyzing section of the machine, including the card feed, is stopped for one cycle, totals are taken during said cycle and, at the conclusion thereof, the card feed and analyzing operations are automatically resumed. Provision is made for the automatic taking of the two classes of sub-totals, which may be designated A and B, from different fields of a card; while the initiation of the taking of a grand total is accomplished by a manual operation such as the pressing of a key 236 (Figs. 1 and 6) to re-start the machine after it has been automatically stopped at the conclusion of a card run. The remaining key and switches adjacent the key 236 and not specifically referred to herein are employed to control other operations of the machine which are not concerned with the change of designation control of the present invention. The taking of sub-totals A and B, in response to a change of designation, is initiated from the micro-switches (Figs. 2 and 6) generally indicated by the numerals 237 and 238, respectively, and the automatic control of these switches will now be described.

As briefly mentioned hereinbefore, any elevated and locked pin 110 in each row of pins will be projected into the path of the pawl 222 individual to said row, causing said pawl to be elevated, as described in connection with the pawls 223, as the scanning frame 211 progresses through its primary movement. Associated with each pawl 222 and supported thereabove by said scanning frame is a slide 239 identical to the slides 225 and controlled in the same manner so as to be moved with said frame when its raised pawl 222 engages a tooth 240 corersponding to the pin 110 which has been elevated. Movement of said slide 239 with the frame 211 disengages one end of a lever 241 from a recess 242 in the upper edge of the slide and thus causes a slight upward swinging movement of said lever, the purpose of which will later appear. With this arrangement it becomes apparent that if corresponding teeth 224 and 240 in the respective slides 225 and 239 are engaged by the associated operating pawls 223 and 222, indicating a similarity in the group designation of the cards then at the two stations 79, 81, both said slides will be moved simultaneously by their pawls to likewise rock the levers 226 and 241, with the result that the group control mechanism, presently to be described, will not become effective to stop the card feed and initiate a totalizing operation at the conclusion of the analyzing cycle and with the further result that the lever 226 will perform its previously described function.

However, if two cards at the sensing and analyzing stations do not compare, then one or the other slide 225 or 239, depending upon the relative positions of the non-corresponding pins 111, 110, will be first engaged and moved by its pawl, followed by the secondary engagement and movement of the other slide. This differential in movement of the two slides results in the operation of one or the other of the switches 237 or 238 depending upon a prearranged set-up made in the group control mechanism in which set-up one field of each card, together with the associated pairs of slides 225, 239, is assigned for taking an A total and a different field is allotted to the B total.

Each pair of levers 226, 241, when rocked either simultaneously or successively, operates a pair of bell cranks 243 and 244, respectively, and the latter elements carry spring-urged pawls 245 and 246 with which is associated an analyzer controlled slide 247 that responds to the operation of said pawls with primary and secondary movements in the same direction, only the secondary movement occurring when there is a change of designation. At each end of said slide the same is provided in its lower edge with a pair of teeth 248, 249, the former of which are engaged by the pawls 245, 246 during the normal condition of the control mechanism, and also during the primary movement of the slide 247 if both said pawls are operated simultaneously. The upper edge of each slide is provided with elongated slots 250 and 251 with which are associated, respectively, the actuating member 252, 253, in the form of a pair of spring-urged levers that normally assume the position shown in Fig. 4 in which their outer extremities are out of the slots 250, 251. Said levers are pivotally supported in rocking bails 254 and 255 that are keyed to the shafts 256 and 257 journaled in the side plates 40, 41 (see also Fig. 2) and which carry the trip plates 258 and 259 of the respective switches 237, 238 so as to close the latter when said shafts are turned by a rocking movement of the bails 254, 255.

To establish a predetermined set-up in the control mechanism with respect to two or more different fields of the cards which are allotted for A and B totals, there is provided a selector device generally indicated at 260 and mounted directly beneath the top plate 42 and partially encased by an auxiliary plate 261. Said device comprises a plurality of slides 262 arranged side by side across the machine and each being individual to one of the card columns. Each slide has a key 263 which extends upwardly through a slot in the plate 42 whereby the key may be adjusted from the neutral position of Fig. 4 to the left or right depending upon whether the card column to which the slide is individual is in a field from which A or B totals, respectively, are to be taken. A spring 264 urges the slide 262 downwardly against the plate 261 which is slotted to receive a guide lug 265 and a projection 266 both on the lower edge of the slide. The projection 266 engages in a recess in the rocker member 267 individual to said slide and mounted, with other similar members, for rocking movement of the common shaft 268. The two lower extremities of the rocker member 267 engage the inner adjacent ends of the associated levers 252 and 253, and control the positions of said levers with respect to the slots 250 and 251 in the slide 247.

In adjusting the selector device preliminary to a machine operation, if a slide 247 assigned to any column of a card is not to be involved in the taking of an A or B total, its associated slide 262 remains in, or is adjusted to, the neutral position so that the rocker member 267 and the levers 252, 253 will assume the position of Fig. 4 wherein said levers will be unaffected by either the primary or secondary movements of the slide 247, which movements are under the influence of the slides 225, 239.

To assign said slide 247 for the taking of an A total, the corresponding key 263 is shifted to the left position, thereby rocking the member 267 counterclockwise to depress the inner end of the lever 252 and release the corresponding end of the lever 253 whose outer end then enters the right hand extremity of the slot 251 in the slide 247. From this, it will be apparent that an adjustment to the right hand position of the key 263 associated with another slide 247 assigned to B total-taking, will effect a reversal of the operation just described so that the outer end of the lever 252 will be positioned in the right hand extremity of the slot 250 of said slide.

Assuming now that two cards at the stations 79, 81, have the same group designations, the pawls 222, 223 will be raised simultaneously by the elevated pins 110, 111 to engage corresponding teeth in the two slides 225, 239, with the result that said slides will be moved from their normal positions at the same time and thus simultaneously rock the bell cranks 243, 244. This action causes the pawls 245, 246 to impart only the primary movement to the slide 247 against the tension of its return spring 269. With the outer end of one or the other levers 252, 253 in the right hand extremity of its associated slot 250, or 251, the latter are of such length that, at the conclusion of said primary movement, the left hand extremities of said slots will only reach, but will not move, the levers 252 or 253 and, therefore, neither of the bails 254, 255 will be rocked to turn their respective shafts 256, 257 to close the associated switches.

Should non-corresponding pins 110, 111 be elevated, indicating a change of designation of the cards, either one or the other of the pawls 222, 223 will be raised first to operate its slide 239 or 225, with the result that one of the bell cranks 243, 244 will be actuated to cause its pawl 245 or 246 to move the slide 247 through its primary movement. The pawl not actuated will then engage the associated second tooth 249 of said slide preparatory to moving the latter through its secondary movement when the bell crank on which the latter pawl is mounted is actuated by the lifting of the other pawl 222 or 223 when it contacts with one of the pins 110 or 111 following the operation of the other of said latter pawls. The secondary movement of the slide 247 will actuate the lever 253 or 252, depending upon whether an A or B total is to be taken, and the actuation of said lever will swing its bail so as to turn the proper shaft to close the switch 237 or 238 to thereby stop the feed section of the machine for one cycle, by maintaining the solenoid 59a de-energized, and initiate a total-taking operation. Upon conclusion of the described operation and while the scanning frame 211 is being restored to its starting position, the restoring bail 270 is reciprocated by a crank 271 on the shaft 272 to trip the pawls 245, 246 so as to disengage them from the teeth of the slide 247 which then restores to its normal position under the influence of its spring 269. One end of the shaft 272 (Fig. 2) is joined, by a crank 273, to the upper end of a link 274, the lower end of which is connected to a crank 275 mounted on a shaft 276 which also carries a crank 277 controlled by a cam 278 (Fig. 3) on the shaft 58 so that the shaft 272 will be rocked to reciprocate the bail 270 in timed relation with the movement of the scanning frame 211.

It will now be apparent that the taking of an A or B total will be controlled from either the sensing station 79 or the analyzing station 81, depending upon the relative positions of the elevated pins at said stations and also upon the pre-selection of either of the levers 252 or 253 for operative association with the slide 247.

What is claimed is:

1. In combination, two analyzing stations at which different parts are compared concomitantly for change of designation therein to control a totalizing mechanism and operating means therefor, a group of analyzing elements at each station for so comparing corresponding columns of different cards at said stations, a single analyzer controlled element common to the two groups of analyzing elements and the card columns analyzed thereby, said common element having primary and secondary movements responsive, respectively, to a similarity between and a change in the designation of cards at said stations, means responsive to a change in designation for effecting both the primary and secondary movements of said controlled element during the concomitant comparison of the cards at said stations, and means operable only by said secondary movement to initiate the operation of said operating means.

2. In combination, two analyzing stations at which different cards are compared concomitantly for change of designation to control totalizing mechanism and operating means therefor, a card analyzer at each station operable to so compare said cards, an analyzer controlled element common to both said analyzer and having primary and secondary movements responsive, respectively, to a similarity between and a change in the designation of cards at said stations, means jointly controlled by said analyzers and responsive to a change in designation for effecting both the primary and secondary movements of said controlled element, and preselected means operatively associated with said controlled element and settable for control thereby from either of said analyzers through the secondary movement of said control element for initiating the operation of said operating means.

3. In combination, two analyzing stations at which different cards are compared concomitantly for change of designation to control totalizing mechanism having operating means for taking different classes of totals, a card analyzer at each station operable to so compare said cards, an analyzer controlled element common to both said analyzers and having primary and secondary movements responsive, respectively, to a similarity between and a change of designation in cards at said stations, and means operatively associated with said controlled element and settable for control thereby and responsive to said secondary movement of said controlled element to cause the functioning of said operating means to actuate said totalizing mechanism to take either class of total.

4. In combination, two analyzing stations at which different cards are compared concomitantly for change of designation to control totalizing mechanism having operating means for taking different classes of totals, analyzers at said stations for so comparing said cards, an analyzer controlled slide common to said stations and having primary and secondary movements responsive, respectively, to a similarity between and a change of designation in cards at said stations, actuating members each assigned to one class of total-taking and selectively movable into operative association with said slide and operated only by a secondary movement of the latter to cause the functioning of said operating means to actuate said totalizing mechanism to take a total of the class assigned to the operated actuating member, and an element common to said actuating members for alternatively adjusting them to operative position relative to said slide.

5. In combination, two analyzing stations at which different cards are compared concomitantly for change of designation and including settable analyzing elements thereat, cyclically operable scanning devices at said stations including operating members differentially actuated in a single cycle of operation of said devices and in accordance with the settings of said analyzing elements, an element common to and controlled by the operating members of said scanning devices and having primary and secondary movements during said single cycle responsive, respectively, to a similarity between and to a change in the settings of the analyzing elements at said stations, switches for controlling a totalizing mechanism, and means operated by the secondary movement of said controlled element to alternatively operate said switches to initiate at total-taking operation.

6. In combination, two analyzing stations at which different cards are compared concomitantly for change of designation and including settable analyzing elements thereat, scanning devices at said stations including operating members engageable with set analyzing elements for differential actuation thereby, an element common to and controlled by the actuated operating members of said scanning devices and having primary and secondary movements responsive, respectively, to a similarity between and to a change in the settings of the analyzing elements at said stations, switches for controlling a totalizing mechanism for taking different classes of totals, and means controlled from either of said stations through said common element, upon a change in settings of said analyzing elements, for operating one of said switches to initiate the operation of said totalizing mechanism to take one class of total.

7. In combination, two analyzing stations at which different cards are compared concomitantly for change of designation and including settable analyzing elements thereat, scanning devices at said stations including operating members engageable with set analyzing elements for differential actuation thereby, an element under the dual control of the actuated operating members of said scanning devices and having primary and secondary movements responsive, respectively, to a similarity between and to a change in the settings of the analyzing elements at said stations, switching means to control a totalizing mechanism for taking different classes of totals, differentially settable means associated with said controlled element and controlled thereby from either of said stations through said controlled element, upon a change in the settings of said analyzing elements, for actuating said switching means to initiate the operation of said totalizing mechanism to take one class of total, and means to differentially set the last named means.

8. In combination, two analyzing stations at which cards are compared for change of designation and including settable analyzing elements thereat, scanning devices at said stations including operating members differentially actuated in accordance with the settings of said analyzing elements, a slide actuated by said operating members upon each operation of said scanning devices and having primary and secondary movements in the same direction responsive, respectively, to a similarity between and to a change in the settings of the analyzing elements at said stations, actuating members selectively adjustable into and out of operative association with said slide and unaffected by the primary movement thereof when in operative association therewith, an element common to said actuating members for adjusting either of them to operative position, and means operable to initiate the operation of a totalizing mechanism when said slide receives a secondary movement upon a change in the settings of said analyzing elements.

9. In combination, two analyzing stations at which cards are compared for change of designation and including settable analyzing elements thereat, scanning devices at said stations including operating members differentially actuated in accordance with the settings of said analyzing elements, a slide actuated by said operating members upon each operation of said scanning devices and having primary and secondary movements in the same direction responsive, respectively, to a similarity between and to a change in the settings of the analyzing elements at said stations, actuating members alternatively and selectively adjustable into and out of operative association with said slide and unaffected by the primary movements thereof when in operative association therewith, two switching devices for alternatively controlling a totalizing mechanism for taking different classes of totals, an element common to said actuating members and operable to preselect one of them for adjustment into operative association with said slide, and means responsive to the operation of the preselected actuating member when said slide receives a secondary movement to operate one of said switching devices to initiate the operation of said totalizing mechanism to take the class of total determined by the preselection of said actuating member.

10. In combination, analyzing and sensing units at which cards are compared for change of designation and including settable elements in each unit, a shaft for operating said units, means also controlled from said shaft for feeding cards to said units, a clutch mechanism for said shaft responsive to a change of designation to prevent operation of said shaft, scanning devices for the settable elements in said units including operating members differentially actuated in accordance with the settings of said settable elements, a slide under the dual control of the operating members of said scanning devices and having primary and secondary movements responsive, respectively, to a similarity between and to a change in the settings of said settable elements, actuating members selectively adjustable into and out of operative association with said slide and unaffected by the primary movements thereof when in operative association therewith, an element common to said actuating members for adjusting either of them to operative position, switching means operable to initiate the operation of a totalizing mechanism when said slide is secondarily moved upon a change in the settings of said settable elements, and means responsive to the operation of the last named means for controlling said clutch mechanism so as to stop the operation of said shaft.

11. In combination, two analyzing stations at which cards are compared for change of designation and including settable analyzing elements thereat, scanning devices at said stations including operating members differentially actuated in accordance with the settings of said analyzing elements, a slide actuated by said operating members upon each operation of said scanning devices and having primary and secondary movements in the same direction responsive, respectively, to a similarity between and to a change in the settings of the analyzing elements at said stations, switches for controlling totalizing mechanism for taking different classes of totals, a selector device for predetermining the class of total to be taken by said mechanism and including a pair of rocker shafts, actuating members, one for each class of total, supported by said shafts for imparting rocking movement thereto and being alternatively and selectively adjustable into and out of operative association with said slide and unaffected by the primary movements thereof when in operative association therewith, an element common to and contacting said actuating members and shiftable in different directions to selectively adjust one of said actuating members to operative position while leaving the other inoperative, a slide for shifting said common element to render one of said actuating members operative to rock the shaft supporting the same when te first named slide has its secondary movement imparted thereto, and means controlled by the rocking of said shaft by said actuating member for operating one of said switches to initiate the taking of the class of total individual to said actuating member.

12. In combination, means to compare cards for change of designation and including groups of settable analyzing elements, each group analyzing corresponding columns of different cards, a scanning device including operating members each differentially actuated in accordance with the setting of a group of said analyzing elements, an element common to and controlled by said operating members and having primary and secondary movements responsive, respectively, to a similarity between and to a change in the settings in said groups of analyzing elements, actuating members alternatively adjustable into and out of operative association with said control element and operated only by the secondary movement of the last named element when in operative association therewith, means common to said actuating members for alternatively adjusting them to operative position relative to said controlled element, and means controlled by an operative actuating member when it is operated by the secondary movement of said controlled element to initiate the taking of a total.

13. In combination, means to compare cards for change of designation and including two groups of settable analyzing elements, each group analyzing corresponding columns of different cards, operating members associated with said groups and each differentially actuated in accordance with the settings in the associated group of said analyzing elements, a slide operated by said operating members upon each actuation thereof and having primary and secondary movements responsive, respectively, to a similarity between and to a change in the settings of said groups of analyzing elements, switches for controlling the taking of different classes of totals, a selector device for predetermining the class of total to be taken and including a pair of rocker shafts each operatively connected to one of said switches, actuating members, one for each class of total, connected to said shafts for imparting rocking movement thereto to operate its associated switch, and means common to said actuating members and operable to alternatively adjust them into operative association with said slide so as to be actuated thereby only upon it receiving a secondary movement.

14. In combination, means to compare cards for change of designation and including groups of settable analyzing elements, each group analyzing corresponding columns of different cards, operating members associated with said groups and each differentially actuated in accordance with the settings in the associated group of said analyzing elements, a slide operated by said operating members upon each actuation thereof and having primary and secondary movements responsive, respectively, to a similarity between and to a change in the settings of said groups of analyzing elements, a switch for controlling the taking of a total, a rocker shaft operatively connected to said switch, an actuating member for said shaft having an inoperative position relative to said slide, and means operable to adjust said actuating member to an operative position with respect to said slide so as to be operated thereby upon it receiving a secondary movement.

WILLIAM WOCKENFUSS.

REFERENCES CITED

The following references are of record in the file of this patent:

UNITED STATES PATENTS

| Number | Name | Date |
|---|---|---|
| 1,944,667 | Pierce | Jan. 23, 1934 |